(12) United States Patent
Halasz

(10) Patent No.: US 10,491,654 B2
(45) Date of Patent: Nov. 26, 2019

(54) COMMUNICATING WITH A REMOTE SERVICE THROUGH A HYPERTEXT TRANSFER PROTOCOL (HTTP) SESSION

(71) Applicant: Red Hat, Inc., Raleigh, NC (US)

(72) Inventor: David Halasz, Okoc (SK)

(73) Assignee: Red Hat, Inc., Raleigh, NC (US)

( * ) Notice: Subject to any disclaimer, the term of this patent is extended or adjusted under 35 U.S.C. 154(b) by 129 days.

(21) Appl. No.: 15/876,447

(22) Filed: Jan. 22, 2018

(65) Prior Publication Data

US 2019/0230146 A1 Jul. 25, 2019

(51) Int. Cl.
*H04L 29/08* (2006.01)
*H04L 29/06* (2006.01)

(52) U.S. Cl.
CPC ........ *H04L 67/025* (2013.01); *H04L 65/4092* (2013.01); *H04L 67/02* (2013.01); *H04L 67/06* (2013.01); *H04L 67/141* (2013.01); *H04L 67/142* (2013.01)

(58) Field of Classification Search
CPC ...... H04L 67/02; H04L 67/141; H04L 67/142
See application file for complete search history.

(56) References Cited

U.S. PATENT DOCUMENTS

| | | | |
|---|---|---|---|
| 9,350,763 B1 | 5/2016 | McHugh et al. | |
| 9,544,287 B1 | 1/2017 | Sokolov et al. | |
| 2015/0052237 A1 | 2/2015 | Fenstad | |
| 2015/0052256 A1* | 2/2015 | Fenstad | H04L 67/40 709/227 |
| 2016/0119399 A1 | 4/2016 | Glass | |
| 2018/0063258 A1* | 3/2018 | Wang | H04L 67/141 |
| 2018/0070152 A1* | 3/2018 | Yang | H04N 21/236 |
| 2018/0295190 A1* | 10/2018 | Lu | H04L 67/141 |

OTHER PUBLICATIONS

Adami, M., "VNC over WebSocket tunnel," Praim, Dec. 5, 2016, https://www.praim.com/vnc-over-websocket-tunnel.

(Continued)

*Primary Examiner* — David R Lazaro
(74) *Attorney, Agent, or Firm* — Kilpatrick Townsend & Stockton LLP

(57) ABSTRACT

A remote service can be communicated with through a hypertext transfer protocol (HTTP) session. For example, a server can receive an HTTP upgrade command from a client device via an HTTP connection. The HTTP upgrade command can include (i) a unique identifier for a service on a remote computing device, and (ii) a protocol for communicating with the service. The server can then identify the service from among various possible services using the unique identifier from the HTTP upgrade command. The server can establish a connection with the remote computing device using the protocol specified in the HTTP upgrade command. The server can then establish an indirect communication pathway between the client device and the remote computing device. The indirect communication pathway can include (i) the HTTP connection from the client device to the server, and (ii) the connection from the server to the remote computing device.

20 Claims, 4 Drawing Sheets

(56) References Cited

OTHER PUBLICATIONS

Fette, I., et al., "The WebSocket Protocol," Internet Engineering Task Force, Dec. 2011, https://www.rfc-editor.org/pdfrfc/rfc6455.txt.pdf.

Nanni, D., "How to Access VNC Remote Desktop in Web Browser," Sep. 24, 2013, http://xmodulo.com/access-vnc-remote-desktop-web-browser.html.

Zlatkov, A., "How JavaScript Works: Deep Drive into WebSockets and HTTP/2 with SSE + How to Pick the Right Path," Nov. 1, 2017, https://blog.sessionstack.com/how-javascript-works-deep-drive-into-websockets-and-http-2-with-sse-how-to-pick-the-right-path-584e6b8e3bf7.

* cited by examiner

COMMUNICATING WITH A REMOTE SERVICE THROUGH A HYPERTEXT TRANSFER PROTOCOL (HTTP) SESSION

TECHNICAL FIELD

The present disclosure relates generally to computer-to-computer connection establishing. More specifically, but not by way of limitation, this disclosure relates to communicating with a remote service through a hypertext transfer protocol (HTTP) session.

BACKGROUND

Computing infrastructures typically include client-facing servers and internal services (e.g., software applications, microservices, etc.) that are inaccessible to client devices for security reasons, such as to prevent malware attacks. But the client-facing servers can access these internal services to perform tasks.

DETAILED DESCRIPTION

Figure 1:
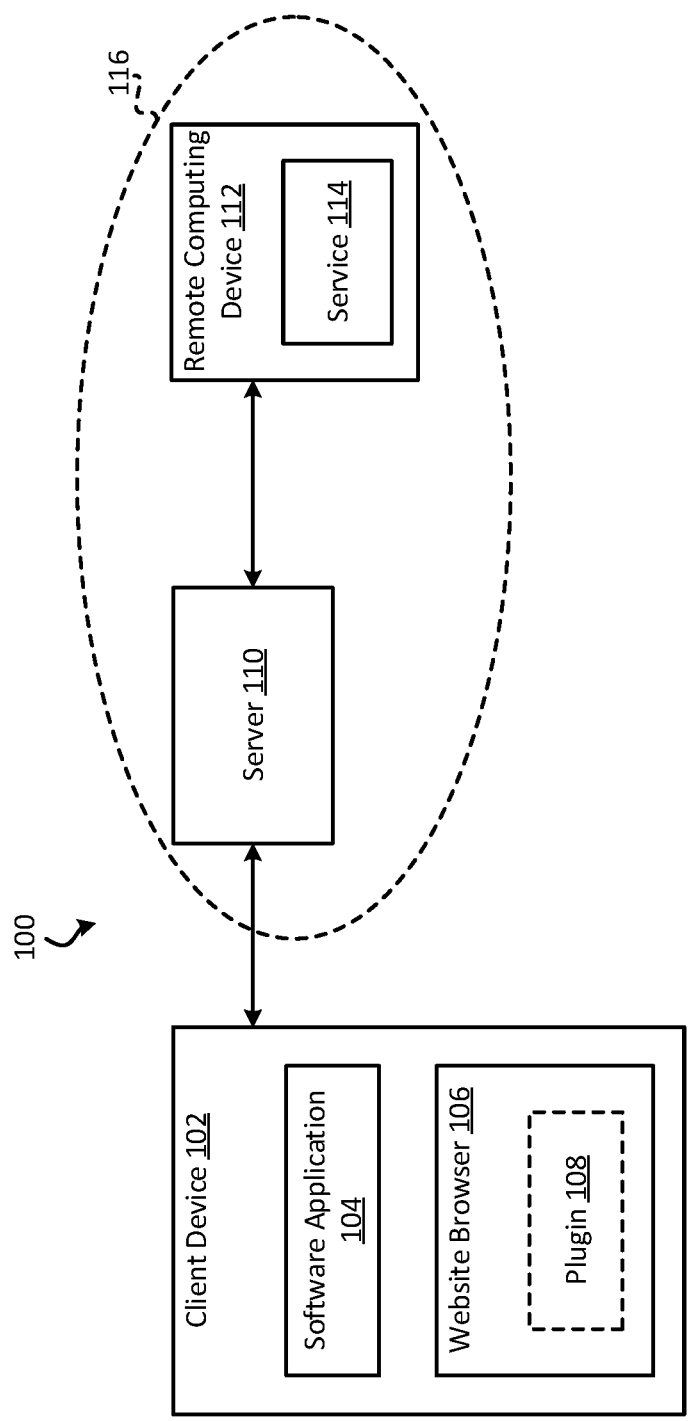
FIG. 1 is a block diagram of an example of a system for communicating with a remote service through a hypertext transfer protocol (HTTP) session according to some aspects.

There can be disadvantageous to preventing client devices from communicating with services that are internal to a computing infrastructure. For example, this can prevent the client devices from being able to remotely perform certain tasks using the internal services. As a specific example, this can prevent a client device from opening a remote desktop connection to a virtual machine that is internal to the computing infrastructure, thereby preventing a user of the client device from performing upgrades or other operations on the virtual machine. And while some system administrators may try to overcome this issue by granting client devices ad-hoc access to a service, this may violate security policies, dangerously expose the service to the general public, and is prone to attack.

Some examples of the present disclosure overcome one or more of the abovementioned issues by enabling a client device to indirectly communicate, via a server, with a service that is internal to a computing infrastructure and otherwise inaccessible to the client device using a hypertext transfer protocol (HTTP) session (e.g., HTTP connection). The server can act as an intermediary between the client device and the service, thereby enabling the service to remain inaccessible to the general public while providing selective access to the service for the client device.

More specifically, some examples of the present disclosure can take advantage of an HTTP upgrade command to establish an indirect communication pathway between the client device and the service via the server, which may be a webserver. An HTTP upgrade command is an HTTP request that includes a connection header that is set to "upgrade" and an upgrade header is set to a particular protocol, such as the transmission control protocol (TCP). The HTTP upgrade command can enable an existing HTTP session between the client device and the server to be switched to the particular protocol specified in the HTTP upgrade command. In some examples, the client device can transmit the HTTP upgrade command to the server as part of an HTTP session. The client device can incorporate a unique identifier for the service within the HTTP upgrade command. The server can extract the unique identifier from the HTTP upgrade command and identify the service from among multiple available services. The server can then connect to the service using the particular protocol specified in the HTTP upgrade command. This can result in an indirect communication pathway between the client device and the service, via the server, that uses the particular protocol. The server can then transmit a success message back to the client device. Thereafter, the client device and the service can bidirectionally communicate data via the communication pathway.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for communicating with a remote service, such as service 114, through a hypertext transfer protocol (HTTP) session according to some aspects. The system 100 includes a client device 102, such as a laptop computer, desktop computer, server, or mobile device. The client device 102 is in communication with a server 110, such as an application server or a webserver. And the server 110 is in communication with a remote computing device 112.

The remote computing device 112 forms an internal portion of a computing infrastructure 116 that is typically inaccessible to the client device 102. The computing infrastructure 116 can be, for example, a cloud computing environment or data grid in which the remote computing device 112 is a node. In some examples, the remote computing device 112 is executing a service 114, such as a remote desktop service through which a user can remotely access a virtual desktop of the remote computing device 112. In some examples, it may be desirable for the client device 102 to communicate with the service 114 to perform one or more tasks.

To establish a communication pathway between the client device 102 and the service 114, the client device 102 can begin by using a website browser 106 (e.g., Chrome™ by Google™) to request a website associated with the service 114 from the server 110. For example, each service in the computing infrastructure 116 can have a predesignated uniform-resource locator (URL). As one particular example, the address "http://www.redhat.com/serviceA" can be the URL for service 114, while the address "http://www.redhat.com/serviceB" can the URL for another service.

The server 110 can respond to the request by transmitting program code for a webpage of the website to the website browser 106. The program code may include Hyper Text Markup Language (HTML) code, JavaScript, or both. The server 110 can embed a unique identifier for the service 114 in the program code. For example, the program code can include the tags "<service ID='SERVICE_A'></service>", where "SERVICE_A" is the unique identifier for the service 114. The server 110 may also embed a code segment (e.g., a program-code segment, such as a JavaScript segment) configured to cause the client device 102 to execute a plugin 208 for the website browser 106.

The website browser 106 of the client device 102 can receive the program code for the website and activate the plugin 108 in response to the code segment. For example, the website browser 106 can execute the code segment, which can cause the website browser 106 to load or run the plugin 108. The plugin 108 can be a software module having computer-readable program code (or "instructions") for adding, extending, or otherwise modifying the functional capability of the website browser 106. After activating the plugin 108, the website browser 106 may then transmit the unique identifier of the service 114 to the plugin 108 for subsequent use. Alternatively, the plugin 108 can obtain the unique identifier of the service 114 using other means.

Once activated, the plugin 108 can open a port on the client device 102 and listen on the port. One example of the port can be port 22. The plugin 108 can select the port from among multiple possible ports that are available for use. The plugin 108 can then indicate that the port is open on the localhost to the website browser 106, which can render "localhost:port" (where port is the number of the open port) in the webpage. For example, the website browser 106 can display "localhost:22" in the webpage. Alternatively, the website browser 106 can display "localhost", the port number, or both in a different arrangement (e.g., within the webpage or elsewhere, such as in a status bar or console of the website browser 106).

A user can view the localhost, port, or both in the website browser 106. The user can then provide that information as input to a software application 104 to connect to the plugin 108 on the port. Examples of the software application 104 can include a secure shell (SSH) client, a file transfer protocol (FTP) client, a TCP client, or another type of client application for communicating with the service 114. For example, the software application 104 can be a Linux terminal in which the user can input "SSH root@localhost-p<port>", where <port> is the port specified in the website browser 106, to establish a SSH connection to the plugin 108. The plugin 108 can accept the connection from the software application 104 on the port.

In some examples, the plugin 108 can determine that the software application 104 is connected to the port and determine a protocol associated with this connection. For example, the plugin 108 can use a lookup table to associate a connection on port 22 with the SSH protocol. The protocol may be any protocol other than HTTP, such as SSH, TCP, HTTPS, Websocket, etc. After determining the protocol, the plugin 108 can open an HTTP connection to the server 110 through which the plugin 108 can transmit an HTTP upgrade command to the server 110. The HTTP upgrade command can indicate the unique identifier of the service 114 and the protocol.

The server 110 can receive the HTTP upgrade command, extract the unique identifier from the HTTP upgrade command, and identify the service 114 from among multiple available services by correlating the unique identifier to the service 114. The server 110 can correlate the unique identifier to the service 114 using a database, lookup table, predefined set of rules, or any combination of these. The server 110 can then establish a connection with the remote computing device 112 (e.g., the service 114 on the remote computing device 112) using the protocol specified in the HTTP upgrade command. If the server 110 successfully establishes the connection with the remote computing device 112, the server 110 can transmit a success message back to the client device 102 via the existing HTTP connection. For example, the server can transmit an HTTP 101 message back to the client device 102.

The client device 102 and the server 110 can maintain the HTTP connection through which the HTTP upgrade command was previously transmitted. This HTTP connection can form part of a communication pathway between the software application 104 and the service 114. The communication pathway can also include the connection from the software application 104 to the plugin 108 and the other connection from the server 110 to the service 114 on the remote computing device 112. The connection from the software application 104 to the plugin 108 and the other connection from the server 110 to the service 114 can have the same protocol, as earlier specified in the HTTP upgrade command.

With the communication pathway established, the software application 104 and the service 114 can communicate (e.g., bidirectionally). For example, the software application 104 can transmit TCP packets to the plugin 108, which can relay the TCP packets to the server 110 via the existing HTTP connection. Thus, the plugin 108 can act as a proxy server, listening on the port and relaying data from the software application 104 to the server 110. The server 110, in turn, can relay the TCP packets to the service 114. For example, the server 110 can decapsulate the data sent through the HTTP connection to obtain the raw TCP packets therein, and then relay the raw TCP packets to the service 114. With this arrangement, the service 114 may not be directly exposed to the client device (or the general public) to improve security, but the service 114 can still be selectively accessed by the client device 102. This arrangement can also enable a user to interact with the service 114 using a software application 104 that is separate from the website browser 106, which may be faster, more flexible, and more intuitive than interacting with the service 114 using an application that is integrated with the website browser 106.

Although the above examples include the website browser 106 and the plugin 108 as separate components performing separate steps, in other examples the website browser 106 may perform some or all of the steps attributed to the plugin 108 above, and vice versa. For example, the system 100 may lack the plugin 108 and the website browser 106 may perform the steps of the plugin 108 discussed above. Additionally or alternatively, the software application 104 may be part of (or include) the website browser 106, rather than being a separate component from the website browser 106.

Figure 2:
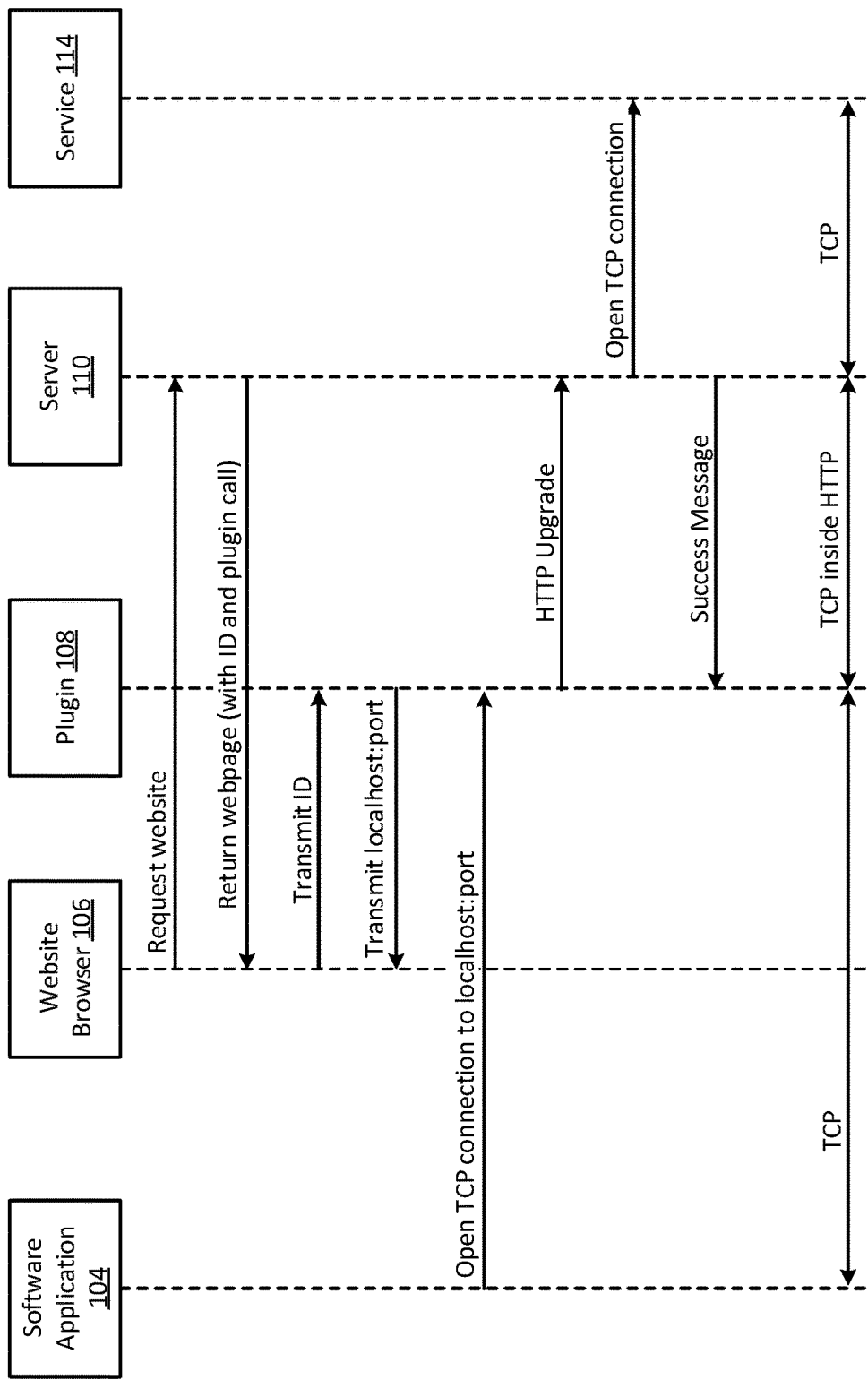
FIG. 2 is a sequence diagram of an example of communicating with a remote service through an HTTP session according to some aspects.

One example of a sequence diagram showing the above-mentioned process is shown in FIG. 2. Other examples can include more steps, fewer steps, different steps, or a different combination of steps than are shown in FIG. 2. The steps of FIG. 2 are discussed below with reference to the components discussed above in relation to FIG. 1.

In FIG. 2, the process begins with the website browser 106 requesting a website from the server 110. The server 110 can respond to the request by returning a webpage associated with the website. The webpage may include a unique identifier for a service 114. The webpage may also include a call (e.g., a function call) or other code segment for running the plugin 108. The website browser 106 can receive the webpage, extract the unique identifier, and run the plugin 108. The website browser 106 can then transmit the unique identifier to the plugin 108 for subsequent use.

Next, the plugin 108 can establish a proxy server on a port. The plugin 108 can transmit the port (e.g., in the form "localhost:port") to the website browser 106, which can display the port to a user.

A software application 104 can then establish a connection with the plugin 108 via the port. In this example, the connection is a TCP connection, but other examples may involve connections that use other protocols. The software application 104 can establish the connection by connecting to the address "localhost" on the port. In some examples, a user can provide the port as input to the software application 104 to connect to the localhost on the port. In other examples, the software application 104 can (i) analyze the webpage, (ii) analyze the website browser 106, (iii) communicate with the website browser 106, (iv) communicate with the plugin 108, or (v) any combination of these, to automatically (e.g., with little or no human involvement) determine the port and establish the connection.

The plugin 108 can detect the connection with the software application 104 and, in response, transmit an HTTP upgrade command to the server 110. The HTTP upgrade command can include the unique identifier of the service 114, a protocol with which to communicate with the service 114, or both. The server 110 can receive the HTTP upgrade command, determine the unique identifier based on the HTTP upgrade command, identify the service 114, and attempt to open another connection to the service 114 using the protocol. In this example, the connection between the server 110 and the service 114 is a TCP connection, but other examples may involve connections that use other protocols. If the server 110 cannot open the connection to the service 114, the server 110 may transmit back an error message. In some examples, if the server 110 transmits back an error message, the plugin 108 may transmit another HTTP upgrade command specifying another protocol, such as Websocket, to cause the process to be repeated for the other protocol. The server 110 may iterate this process using different protocols until a predetermined condition is met (e.g., a timeout period has expired, the server 110 transmits back a success message, etc.). If the server 110 successfully opens the connection to the service 114, the plugin 108 can transmit a success message to the plugin 108.

With the connection between the server 110 and the service 114 established, the software application 104 can now communicate data to the service 114. For example, the software application 104 can transmit a TCP packet to the plugin 108, which can relay the TCP packet via the existing HTTP connection to the server 110. The server 110, in turn, can relay the TCP packet to the service 114. The service 114 can then receive the TCP packet and perform an operation based on the payload of the TCP packet. The service 114 can communicate data to the software application 104 using the reverse of this process.

Figure 3:
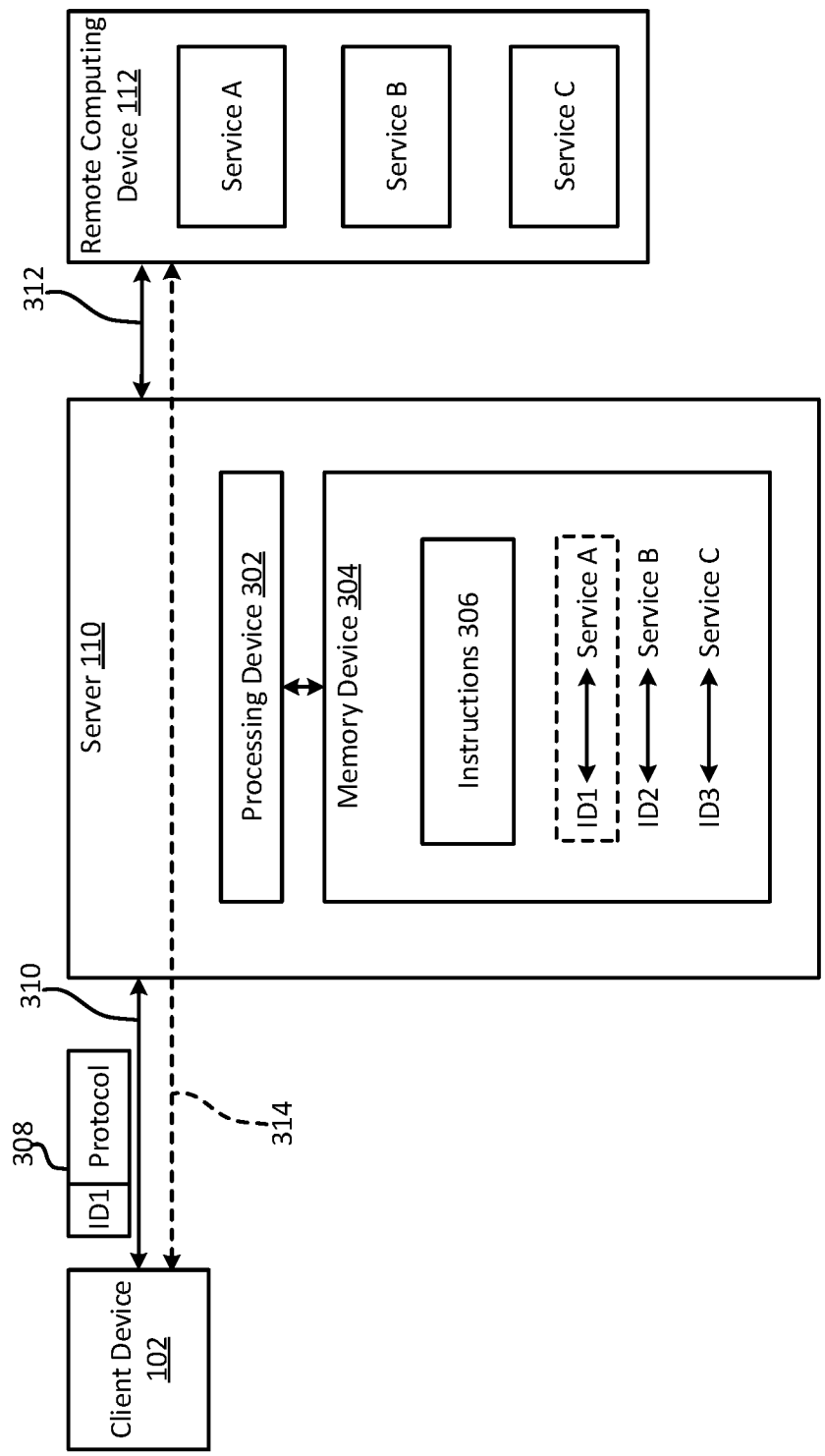
FIG. 3 is a block diagram of another example of a system for communicating with a remote service through an HTTP session according to some aspects.

FIG. 3 is a block diagram of another example of a system 300 for communicating with a remote service through an HTTP session according to some aspects. The system 300 includes a server 110 that has a processing device 302 communicatively coupled with a memory device 304. The processing device 302 can include one processing device or multiple processing devices. Non-limiting examples of the processing device 302 include a Field-Programmable Gate Array (FPGA), an application-specific integrated circuit (ASIC), a microprocessor, etc. The processing device 504 can execute instructions 306 stored in the memory device 304 to perform operations. In some examples, the instructions can include processor-specific instructions generated by a compiler or an interpreter from code written in any suitable computer-programming language, such as C, C++, C#, etc.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, or any other type of non-volatile memory. In some examples, at least some of the memory device can include a medium from which the processing device 302 can read instructions 306. A computer-readable medium can include electronic, optical, magnetic, or other storage devices capable of providing the processing device 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the memory device 304 can also include relationships between unique identifiers and services. In this example, the memory device 304 includes relationships between ID1 and Service A, ID2 and Service B, and ID3 and Service C. This can enable the server 110 to identify a service that corresponds to a unique identifier transmitted by the client device 102.

In some examples, the client device 102 can transmit an HTTP upgrade command 308 to the server 110 via a connection 310, such as an HTTP session. The HTTP upgrade command 308 can include a unique identifier of a service on the remote computing device 112. In this example, the HTTP upgrade command has the unique identifier "ID1" that corresponds to Service A on the remote computing device 112. The server 110 can receive the HTTP upgrade command 308 and determine the service that corresponds to the unique identifier in the HTTP upgrade command 308. For example, the server 110 can extract ID1 from the HTTP upgrade command 308 and correlate ID1 to Service A, as indicated by the dashed box. The server 110 can then establish a connection 312 to the remote computing device 112 using a protocol specified in the HTTP upgrade command 308. With connection 310 open and connection 312 open, an indirect communication pathway 314 from the client device 102 to the remote computing device 112 is established. This can enable a software application on the client device 102 to communicate with a service on the remote computing device 112. For example, this can enable the software application on the client device 102 to communicate with Service A on the remote computing device 112.

Although services A-C are depicted as being on the remote computing device 112 in this example, other examples can involve any number and combination of services being spread out among any number and combination of remote computing devices.

Figure 4:
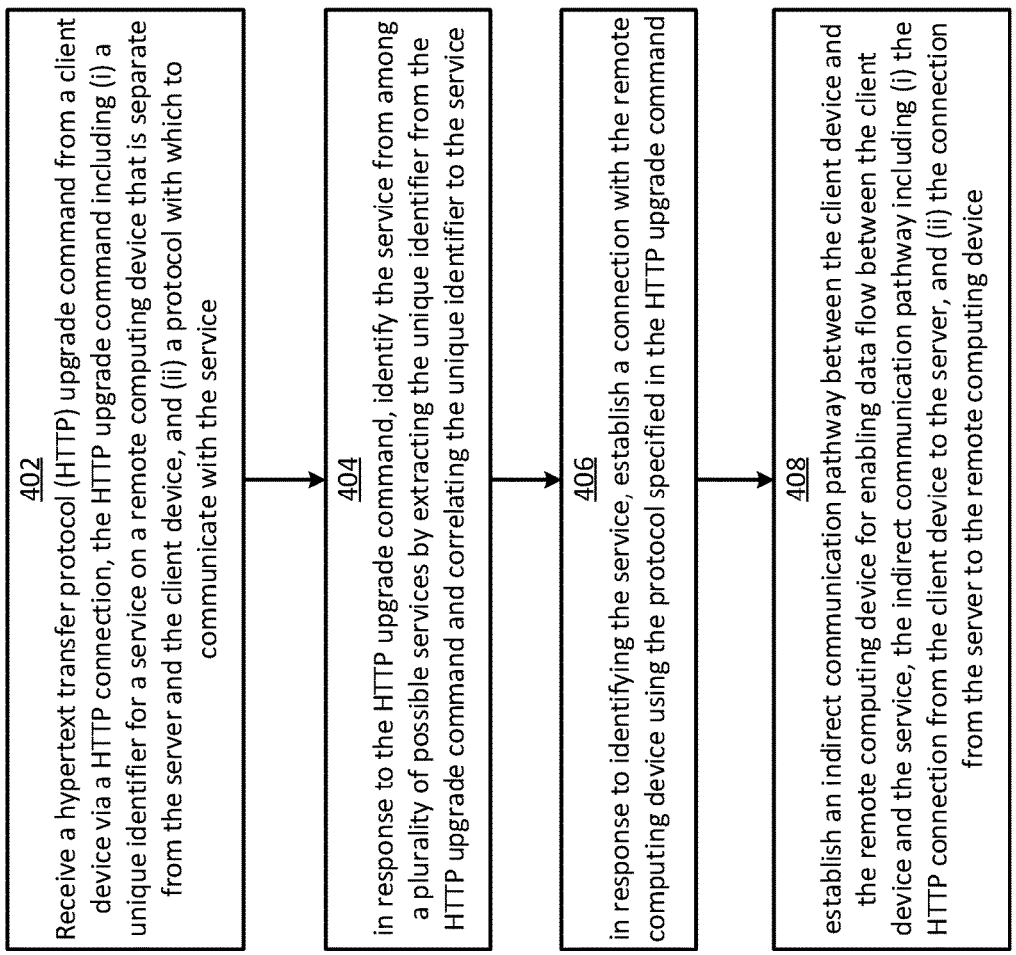
FIG. 4 is a flow chart showing an example of a process for communicating with a remote service through an HTTP session according to some aspects.

FIG. 4 is a flow chart showing an example of a process for communicating with a remote service through an HTTP session according to some aspects. Other examples can include more steps, fewer steps, different steps, or a different combination of steps than are shown in FIG. 4. The steps of FIG. 4 are discussed below with reference to the components discussed above in relation to FIG. 3.

In block 402, server 110 receives a HTTP upgrade command 308 from a client device 102 via an HTTP connection, such as connection 310. The HTTP upgrade command 308 can include (i) a unique identifier for a service 114 on a remote computing device 112 that is separate from the server 110 and the client device 102, and (ii) a protocol with which to communicate with the service 114.

In block 404, the server 110 identifies the service 114 from among a plurality of possible services (e.g., Services A-C) by extracting the unique identifier from the HTTP upgrade command 308 and correlating the unique identifier to the service 114. Alternatively, the server 110 can determine the service 114 based on the unique identifier using another approach, such as by using an algorithm that includes a relationship between services and unique identifiers. The server 110 may identify the service 114 in response to the HTTP upgrade command 308.

In block 406, the server 110 establishes a connection 312 with the remote computing device 112 using the protocol specified in the HTTP upgrade command 308. For example, the server 110 can open a TCP connection to the remote computing device 112 and maintain the TCP connection for subsequent use.

In block 408, the server 110 establishes an indirect communication pathway 314 between the client device 102 and the remote computing device 112 for enabling data flow between the client device 102 and the service 114. The indirect communication pathway 314 can include (i) the HTTP connection from the client device 102 to the server 110, and (ii) the connection 312 from the server 110 to the remote computing device 112.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s).

The invention claimed is:

1. A server comprising:
a processing device; and
a memory device on which instructions executable by the processing device are stored for causing the processing device to:
receive a hypertext transfer protocol (HTTP) upgrade command from a client device via an HTTP connection, the HTTP upgrade command including (i) a unique identifier for a service on a remote computing device that is separate from the server and the client device, and (ii) a protocol with which to communicate with the service;
in response to the HTTP upgrade command, identify the service from among a plurality of possible services by extracting the unique identifier from the HTTP upgrade command and correlating the unique identifier to the service;
in response to identifying the service, establish a connection with the remote computing device using the protocol specified in the HTTP upgrade command; and
establish an indirect communication pathway between the client device and the remote computing device for enabling data flow between the client device and the service, the indirect communication pathway including (i) the HTTP connection from the client device to the server, and (ii) the connection from the server to the remote computing device.

2. The server of claim 1, wherein the memory device further comprises instructions that are executable by the processing device for causing the processing device to, prior to receiving the HTTP upgrade command:
receive a request for a webpage from a website browser of the client device; and
in response to the request, transmit program code for the webpage to the client device, the program code including the unique identifier for the service.

3. The server of claim 2, wherein the program code further includes a code segment configured to cause a plugin for the website browser to execute on the client device.

4. The server of claim 3, wherein the memory device further comprises instructions that are executable by the processing device for causing the processing device to:
receive the HTTP upgrade command from the plugin for the website browser on the client device; and
transmit a success message to the plugin for the website browser in response to establishing the connection with the remote computing device.

5. The server of claim 4, wherein the memory device further comprises instructions that are executable by the processing device for causing the processing device to:
establish the indirect communication pathway between a software application on the client device and the service for enabling data flow between the software application and the service, the software application being separate from the website browser.

6. The server of claim 5, wherein:
the server is a webserver;
the service is a remote desktop service; and
the software application is a remote desktop application.

7. The server of claim 1, wherein the protocol is a transmission control protocol (TCP) and the connection with the remote computing device is a TCP connection.

8. A method comprising:
receiving, by a server, a hypertext transfer protocol (HTTP) upgrade command from a client device via an HTTP connection, the HTTP upgrade command including (i) a unique identifier for a service on a remote computing device that is separate from the server and the client device, and (ii) a protocol with which to communicate with the service;
in response to the HTTP upgrade command, identifying, by the server, the service from among a plurality of possible services by extracting the unique identifier from the HTTP upgrade command and correlating the unique identifier to the service;
in response to identifying the service, establishing, by the server, a connection with the remote computing device using the protocol specified in the HTTP upgrade command; and
establishing, by the server, an indirect communication pathway between the client device and the remote computing device for enabling data flow between the client device and the service, the indirect communication pathway including (i) the HTTP connection from the client device to the server, and (ii) the connection from the server to the remote computing device.

9. The method of claim 8, further comprising, prior to receiving the HTTP upgrade command:
receiving a request for a webpage from a website browser of the client device; and
in response to the request, transmitting program code for the webpage to the client device, the program code including the unique identifier for the service.

10. The method of claim 9, wherein the program code further includes a code segment configured to cause a plugin for the website browser to execute on the client device.

11. The method of claim 8, further comprising:
receiving the HTTP upgrade command from a plugin for a website browser on the client device; and
transmitting a success message to the plugin for the website browser in response to establishing the connection with the remote computing device.

12. The method of claim 8, further comprising:
establishing the indirect communication pathway between a software application on the client device and the service for enabling data flow between the software application and the service, the software application being separate from a website browser of the client device.

13. The method of claim 12, wherein:
the server is a webserver;
the service is a remote desktop service; and
the software application is a remote desktop application.

14. The method of claim 8, wherein the protocol is a transmission control protocol (TCP) and the connection with the remote computing device is a TCP connection.

15. A non-transitory computer-readable medium comprising instructions that are executable by a processing device of a server for causing the processing device to:
receive a hypertext transfer protocol (HTTP) upgrade command from a client device via an HTTP connection, the HTTP upgrade command including (i) a unique identifier for a service on a remote computing device that is separate from the server and the client device, and (ii) a protocol with which to communicate with the service;
in response to the HTTP upgrade command, identify the service from among a plurality of possible services by extracting the unique identifier from the HTTP upgrade command and correlating the unique identifier to the service;
in response to identifying the service, establish a connection with the remote computing device using the protocol specified in the HTTP upgrade command; and
establish an indirect communication pathway between the client device and the remote computing device for enabling data flow between the client device and the service, the indirect communication pathway including (i) the HTTP connection from the client device to the server, and (ii) the connection from the server to the remote computing device.

16. The non-transitory computer-readable medium of claim 15, further comprising instructions that are executable by the processing device for causing the processing device to, prior to receiving the HTTP upgrade command:
receive a request for a webpage from a website browser of the client device; and
in response to the request, transmit program code for the webpage to the client device, the program code including the unique identifier for the service.

17. The non-transitory computer-readable medium of claim 16, wherein the program code further includes a code segment configured to cause a plugin for the website browser to execute on the client device.

18. The non-transitory computer-readable medium of claim 15, further comprising instructions that are executable by the processing device for causing the processing device to:
receive the HTTP upgrade command from a plugin for a website browser on the client device; and
transmit a success message to the plugin for the website browser in response to establishing the connection with the remote computing device.

19. The non-transitory computer-readable medium of claim 15, further comprising instructions that are executable by the processing device for causing the processing device to:
establish the indirect communication pathway between a software application on the client device and the service for enabling data flow between the software application and the service, the software application being separate from a website browser of the client device.

20. The non-transitory computer-readable medium of claim 15, wherein the protocol is a transmission control protocol (TCP) and the connection with the remote computing device is a TCP connection.

* * * * *